Sept. 22, 1925.                                                     1,554,406
C. J. COBERLY
CUTTING TORCH WITH OSCILLATING TIP
Filed Feb. 27, 1924
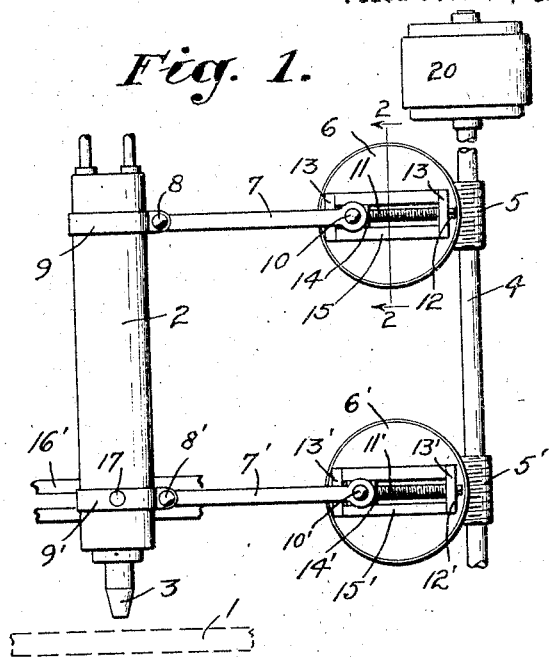
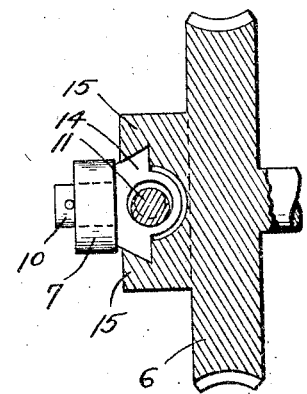
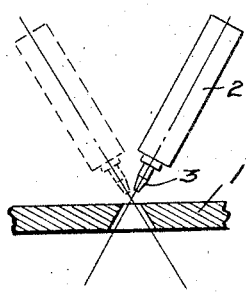
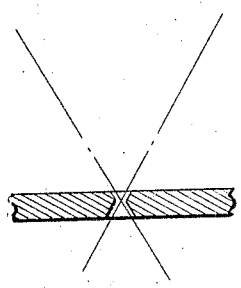
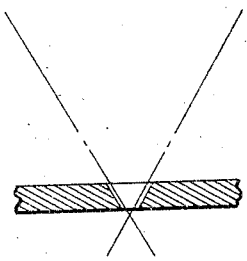
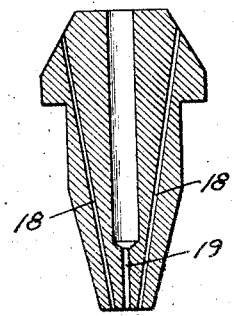
INVENTOR:
CLARENCE J. COBERLY,
BY
Graham + Luive
ATTORNEYS.

Patented Sept. 22, 1925.

1,554,406

UNITED STATES PATENT OFFICE.

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA.

CUTTING TORCH WITH OSCILLATING TIP.

Application filed February 27, 1924. Serial No. 695,475.

*To all whom it may concern:*

Be it known that I, CLARENCE J. COBERLY, a citizen of the United States, residing at Los Angeles, in the county of Los Angeles, State of California, have invented a new and useful Cutting Torch with Oscillating Tip, of which the following is a specification.

Although my present invention is referred to as a cutting torch with an oscillating tip, a preferred embodiment of this invention may comprise means capable of effecting the bodily oscillation of an entire torch in a plane not extending longitudinally of the slot cut thereby.

It is a further object of this invention to provide means comprising a torch whose body or tip is provided with means for oscillating the same in a manner favorable to the cutting of a slot having a predetermined diameter and a predetermined transverse sectional outline.

It is an object of this invention to provide means for mechanically oscillating a single cutting torch, or the tip thereof, preferably about a projected center, during the cutting of a slot by a rectilinear or other traversing movement imparted in any preferred manner either to said torch or to the article slotted thereby.

It is a further object of this invention to provide means comprising a variable-throw device capable of use in maintaining or varying at will either the width or the shape of a slot cut by a single torch during a traversing movement of a metallic or other object relatively thereto.

Other objects of my invention will appear from the following description of an illustrative embodiment thereof, taken in connection with the appended claims and the accompanying drawings, in which—

Fig. 1 is a diagrammatic elevational view of an oscillating torch and operating means therefor, one suitable relative position of a plate to be slotted thereby being indicated by dash lines.

Fig. 2 is an enlarged detail section on line 2—2 of Fig. 1.

Figs. 3, 4 and 5 are respectively diagrams illustrating the procedures suitable to the cutting, by means of my novel oscillating torch, of slots expanding downwardly (Fig. 3), or provided with an intermediate plane of constriction (Fig. 4), or contracting downwardly (Fig. 5), the torch employed being, in any of the cases referred to, oscillated about a projected center whose position may determine the character of the slot formed.

Fig. 6 is an illustration of one form of tip suitable for use in an organization embodying my invention.

Referring to the details of that specific embodiment of my invention chosen for purpose of illustration, 1 may be a metallic plate or other article to be slotted, 2 being the body of a torch whose tip 3 is disposed in proximity to said plate, and 20 being an electrical motor or other suitable source of power for imparting an oscillatory movement to said torch, or to the tip thereof, during a relative traversing movement (produced by any preferred means not shown) between said torch and said plate, to effect a desired slotting of the latter.

Although any preferred means might be employed to effect an oscillation of the torch 2, or of its tip 3, by motion transmitted from a source such as the motor 20, I disclose for this purpose an organization comprising a shaft 4 rotated by said motor and carrying worms 5, 5', respectively engaging worm wheels 6, 6', from which motion may be transmitted in any suitable way to either or both of the ends of the torch 2.

In order to transform the rotary motion of the worm wheels 6, 6' into suitable oscillatory motion, I may employ means such as the links 7, 7' respectively pivoted at their outer ends, as by means of pins 8, 8', to straps 9, 9', surrounding the respective ends of the torch 2, the inner ends of the mentioned links being in turn pivotally connected to the worm wheels 6, 6' by means of wrist pins 10, 10' mounted thereon.

In order to permit of a suitable adjustment or control of the relative oscillation imparted to the respective ends of a torch 2, I may employ, in connection with the parts referred to, any preferred type of variable-throw apparatus, my disclosed means for this purpose comprising threaded shafts 11, 11' provided with squared ends 12, 12' and rotatably mounted between cooperating pairs of lugs or projections 13, 13' upon flat faces of the worm wheels 6, 6', the exterior threads of the respective shafts 11, 11' being adapted to engage corresponding interior threads upon blocks 14, 14' carrying the mentioned wrist pins 10, 10' and retained between guides 15, 15' on said worm wheels.

In order to maintain a suitable distance between a tip 3 of a cutting torch and the work to be slotted thereby, I may employ means such as the guides 16', adapted to be engaged by interfitting means projecting from an oscillated torch, my disclosed means for this purpose comprising a pair of oppositely extending pins 17 upon the strap 9' by which motion is transmitted to one end of the torch 2.

It is believed that the general mode of operation of an oscillating torch of the general character referred to may be understood from the foregoing description; but attention is called not only to the possibility of varying the mentioned oscillatory movement within wide limits by suitable adjustment of the respective wrist pins 10, 10' upon the worm wheels 6, 6', but also to the possibility of varying the character of a slot formed by mere variation in the position of a consequent projected center of oscillation relatively to the surface of a metallic or other body slotted. Assuming, for example, that the tip 3 is of the general character illustrated in Fig. 6, this tip being provided with a plurality of non-parallel passages 18 for the delivery of a combustible mixture to produce a heating effect and with a central passage 19 for the delivery of an excess of a cutting gas, it will be obvious that, when the wrist pins 10, 10' are respectively positioned as disclosed in Fig. 1, a comparatively wide slot having substantially parallel walls may be formed in the plate 1; whereas, if the lower wrist pin 10' were carried to a position nearer the center of the worm wheel 6', the entire torch might be oscillated about a projected center in the general manner illustrated in Figs. 3, 4 and 5; and the various results indicated in these respective figures might then be obtainable by a mere variation in the perpendicular distance between the tip 3 and the plate 1.

While the term oscillating is used in the above description to designate the transverse movements of the torch, it is to be understood that in its broadest aspect the present invention embodies a torch having any form of transverse movement by which is produced a slot of greater width than that produced by a transversely stationary torch or by which is produced a slot having converging, or diverging, side walls; such transverse movement of the torch may be of a character in which one or both ends of the torch are oscillated simultaneously in the same, or opposite, directions, or in which the torch is bodily reciprocated while maintained substantially normal to the plane of the work, it being further recognized that the term vibrate will properly define such movements which may be short and rapid relative to the longitudinal translation of the torch or work.

Although I have herein described one complete embodiment of my invention, it will be understood that various features thereof might be independently employed, and also that various modifications might be made therein without involving the slightest departure from the spirit and scope of my invention as the same is indicated above and in the following claims.

I claim as my invention:

1. In a slotting organization, the combination of: a cutting torch movably mounted in relation to a body to be slotted for longitudinal translation along the line of the slot and for transverse movement relative thereto; and means for causing a transverse vibration of the torch during longitudinal translation thereof.

2. In a slotting organization, the combination of: a cutting torch movably mounted in relation to a body to be slotted for longitudinal translation along the line of the slot, and for transverse movement relative thereto; and means for transversely oscillating the torch during longitudinal translation thereof.

3. In a slotting organization, the combination of: a cutting torch movably mounted in relation to a body to be slotted for longitudinal translation along the line of the slot and for transverse movement relative thereto; means for causing a transverse vibration of the torch during longitudinal translation thereof; and means for varying the degree of transverse vibration.

4. In a slotting organization, the combination of: a cutting torch movably mounted in relation to a body to be slotted for longitudinal translation along the line of the slot and for transverse movement relative thereto; means for transversely oscillating the torch during longitudinal translation thereof; and means for varying the throw of said oscillating means.

5. In a slotting organization, the combination of: a cutting torch movably mounted in relation to a body to be slotted for longitudinal translation along the line of the slot and for transverse movement relative thereto; and means for transversely oscillating the torch during longitudinal translation thereof, said oscillating means comprising a rotating element carrying a wrist pin.

6. In a slotting organization, the combination of: a cutting torch movably mounted in relation to a body to be slotted for longitudinal translation along the line of the slot and for transverse movement relative thereto; and means for transversely oscillating the torch during longitudinal translation thereof, said oscillating means comprising a link pivotally connected to a rotating element and to said torch.

7. In a slotting organization, the combination of: a cutting torch movably mounted in relation to a body to be slotted for longitudinal translation along the line of the slot and for transverse movement relative thereto; means for transversely oscillating the torch during longitudinal translation thereof; and means for guiding one end of said torch during its oscillation.

8. In a slotting organization, the combination of: a cutting torch movably mounted in relation to a body to be slotted for longitudinal translation along the line of the slot and for transverse movement relative thereto; and means for transversely oscillating both ends of the torch during longitudinal translation thereof.

9. In a slotting organization, the combination of: a cutting torch movably mounted in relation to a body to be slotted for longitudinal translation along the line of the slot and for transverse movement relative thereto; and means for transversely oscillating both ends of the torch during longitudinal translation thereof, said means oscillating the torch about a projected center to produce a slot having angled side walls.

10. In a slotting organization, the combination of: a cutting torch movably mounted in relation to a body to be slotted for longitudinal translation along the line of the slot and for transverse movement relative thereto; means for transversely reciprocating one end of the torch; a second means for transversely reciprocating the opposite end of the torch; and means for independently varying the relative sequence and the length of stroke of each reciprocating means, whereby both ends of the torch may be reciprocated in unison to produce a slot having parallel side walls, or whereby each end of the torch may be variously reciprocated to produce a slot having angled side walls.

In testimony whereof, I have hereunto set my hand at Los Angeles, California, this 21st day of February, 1924.

CLARENCE J. COBERLY.